No. 730,199. PATENTED JUNE 2, 1903.
M. L. THEDFORD.
NUT LOCK.
APPLICATION FILED DEC. 31, 1902.
NO MODEL.
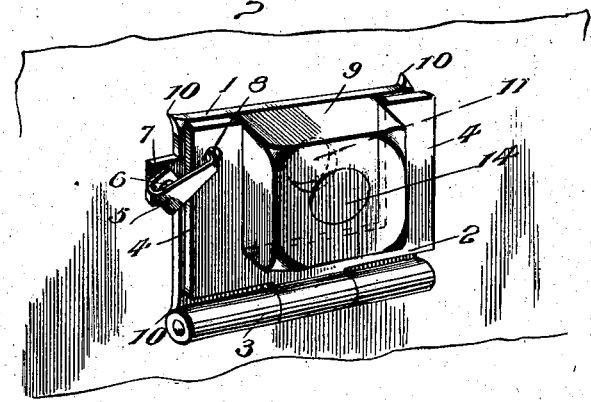
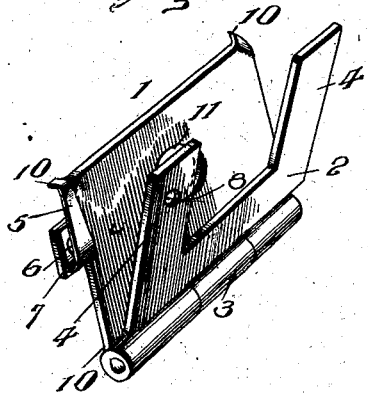
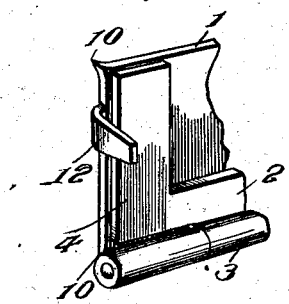
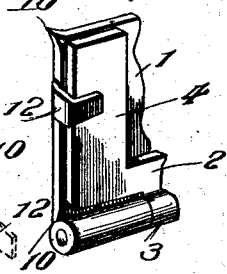
Witnesses
Inventor
M. L. Thedford.
By Burton T. Doyle,
His Attorney No. 730,199.      Patented June 2, 1903.

UNITED STATES PATENT OFFICE.

MARSHALL L. THEDFORD, OF DYERSBURG, TENNESSEE.

NUT-LOCK.

SPECIFICATION forming part of Letters Patent No. 730,199, dated June 2, 1903.

Application filed December 31, 1902. Serial No. 137,349. (No model.)

*To all whom it may concern:*

Be it known that I, MARSHALL L. THEDFORD, a citizen of the United States, residing at Dyersburg, in the county of Dyer and State of Tennessee, have invented certain new and useful Improvements in Nut-Locks, of which the following is a specification.

My invention relates to nut-locks; and one of its objects is to produce a device which will hold a nut securely locked in one position and prevent its working loose from vibration or other causes growing out of the use of the rail or other object upon which my device may be used.

Another object of my invention is to produce a nut-lock of the character described which may be used for locking a nut either temporarily or permanently.

Another object of my invention is to produce a nut-lock of the character described which may be used upon a bolt or other threaded end projected in any direction.

Another object of my invention is to produce a nut-lock of the character described which shall be provided with integral means for holding it rigidly in place against the face of the surface through which the bolt or other threaded end may be passed.

I attain these and other objects not specially enumerated by use of the construction and novel combination and arrangement of the parts which are described in this specification, pointed out in the claims, and illustrated in the accompanying drawings, which form a part of this specification, and in which—

Figure 1 is a perspective view of a nut locked temporarily by use of one form of my invention. Fig. 2 is a perspective view of the same form of my invention disengaged from the nut. Fig. 3 is an end view of the washer-base of my nut-lock, showing the relative position of the hinged clasp which holds one arm of the lock-flap in a fixed position around the nut. Fig. 4 is a detail view of a fractional part of my device, showing in an unfastened position the clasp which I may use in holding the nut-encompassing arms of the lock-flap permanently in position around the nut. Fig. 5 is a similar view showing said clasp in a fastened position, and Fig. 6 is a perspective view of a nut locked with my device by use of my rotatable clasp on one of the arms around the nut and of my fixed or rigid clasp on the other arm around the nut.

Like characters of reference denote like parts wherever they occur in the various views of the drawings.

1 is the washer-base of my device, 2 is the lock-flap thereof, and 3 the hinge which holds these two parts rotatably fastened together. 4 4 are nut-encompassing arms integrally provided on the lock-flap of the hinged device thus formed, and 5 is a rotatably-pivoted side clasp mounted on a shoulder 7, which is provided on one end of the washer-base.

6 is a rivet passed through apertures provided through the pivot end of said clasp 5 and said shoulder 7.

8 is an aperture provided through the arm 4 on the clasp side of the nut to engage the hook or bend 13, provided on the loose end of the clasp, when said clasp is sprung over said arm after said arm has been brought down against the face of the washer-base, and thus prevent the clasp from working off of said arm.

10 10 10 10 are integral lugs projected downwardly from the corners of the washer-base and adapted to be forced into the face of the surface against which said washer-base is pressed as the nut 9 is screwed down over the end of the bolt 14 after said bolt has been passed through the aperture 11, provided through the washer-base, and before the arms 4 4 are closed down around the nut and locked by use of the clasp.

Without meaning to be limited to the exact construction and arrangement of parts above shown and described, since I am aware that many minor changes may be made in them without departing from the scope and spirit of my invention,

What I claim, and desire to secure by Letters Patent, is—

1. In nut-locks, the combination with a washer-base and a nut-encompasing lock-flap hinged together, of a side clamping rotatable clasp, comprising a clasp pivotally mounted on the washer-base and adapted to engage and lock one of the nut-encompassing arms of the lock-flap, said flap being apertured to receive the end of said rotatable clasp, substantially as described.

2. In a nut-lock, the combination, with a bolt-accommodating washer-base and a nut-encompassing lock-flap, hinged together, of an integral side shoulder on the washer-base, a rotatable side clasp, having one end pivotally mounted upon said integral side shoulder and the other end thereof provided with a bent part; a nut-encompassing arm provided with an aperture near its end to engage said bent part, and a washer-base provided with downwardly-projected lugs adapted to engage the surface against which said washer-base rests, substantially as described.

In testimony whereof I affix my signature in presence of two witnesses.

M. L. THEDFORD.

Witnesses:
A. C. DUNLOP,
MOSE MILLER.